United States Patent Office 3,551,297
Patented Dec. 29, 1970

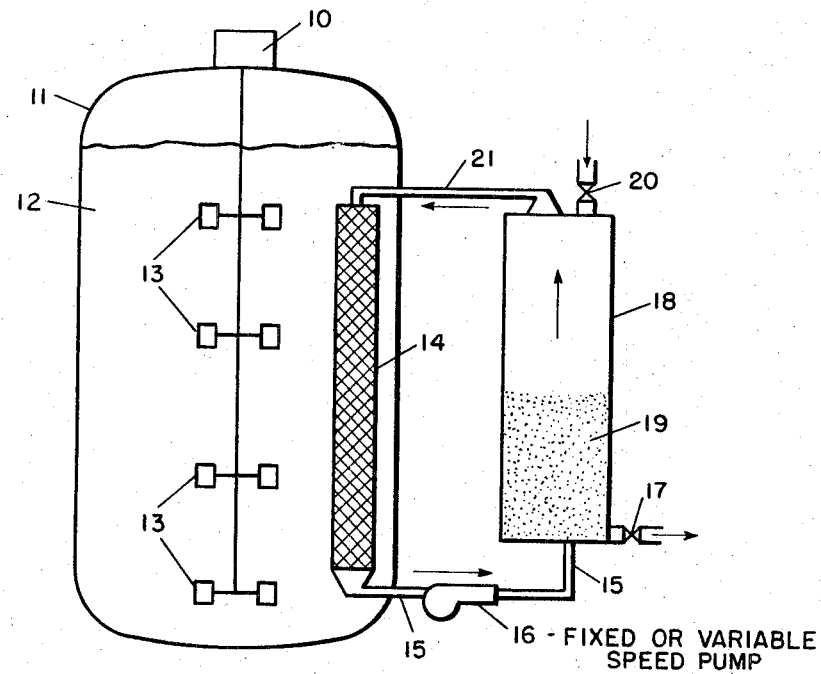
INVENTOR.
PETER HOSLER

3,551,297
PROCESS AND EQUIPMENT FOR CONTINUOUS REMOVAL OF FERMENTATION PRODUCTS WITH ION EXCHANGE RESINS
Peter Hosler, Wallingford, Pa., assignor to Sun Oil Company, Philadelphia, Pa., a corporation of New Jersey
Filed Aug. 30, 1967, Ser. No. 664,414
Int. Cl. C12b 1/00
U.S. Cl. 195—143                        8 Claims

ABSTRACT OF THE DISCLOSURE

A process and apparatus are provided whereby fermentation may be carried out in the presence of an ion exchange resin under conditions such that direct contact of the resin with the agitator in the fermentor is avoided, thereby preventing attrition of the resin, and separation and recovery of the resin from the broth are facilitated. This is achieved by providing a fermentation vessel with a screened-off zone within the vessel for the ion exchange resin, which screen is permeable to the fermentation broth but not the resin, an inlet and outlet from the screened-off area connected to an external reservoir for the ion exchange resin, and a pumping means situated between the screened-off area and the reservoir for circulating the resin and broth in the form of a suspension. Increased liquid velocities at the surface of the resin are obtained by circulating the ion exchange resin from the external reservoir through the screened-off zone inside the fermentation vessel and back into the reservoir; at the same time the physical isolation of the resin from the fermentor's agitator substantially reduces the attrition of the ion exchange resin, and facilitates separation and recovery of the resin from the broth.

BACKGROUND OF THE INVENTION

This invention relates to a process and apparatus for the removal of fermentation elaboration products from fermentation broths. More particularly, this invention relates to an improved method and apparatus for contacting ion exchange resins with fermentation broths by providing a separate contacting zone for the resin in a fermentation tank which is equipped with mechanical agitators.

Many fermentations form commercially valuable organic compounds as elaboration products of fermentative oxidation, and particularly organic acids such as oxalic acid, succinic acid, benzoid acid and toluic acid. However, the presence of these acids in the fermentation broth, while they are of commercial importance, nevertheless, is undesirable in excess of certain low concentrations because of their inhibitory action on the fermentation; that is to say, the very by-products formed by the fermentative action of the cells can eventually be deleterious to the cells, and as the concentration of these by-products increases, the activity of the cells decreases and eventually stops altogether. Also, certain other elaboration products, such as antibiotics, are unstable in fermentation broths, and are degraded rapidly unless they are recovered promptly from the broth.

In order to overcome certain of these difficulties, it has been proposed that fermentation products be removed in situ during fermentation by the addition of ion exchange resins to the fermentation broth. Thus, for example, it has been suggested in United States Pat. No. 3,000,792 that ion exchange resins which would selectively adsorb antibiotics be added to the fermentation broth during the course of the fermentation. This procedure, although it does improve the yield of antibiotic recovered, nevertheless, presents many difficulties which detract from its usefulness on a commercial scale. For example, substantial attrition of the ion exchange resin occurs when it comes in contact with mechanical agitators of the fermentation vessel. Also, this method does not provide for the continuous addition and withdrawal of ion-exchange resin in order that there may be maximum contact of fresh resin with the fermentation broth. Finally, the procedure taught by United States Pat. No. 3,000,792 has the further disadvantage of requiring an additional separation step for the recovery of the resin from the broth, including dilution, filtering, washing steps and the like.

In addition to the foregoing disadvantages, it has also been found that when ion exchange resins are added to fermentations which elaborate weak acids, poor equilibrium of weak acid formation and adsorption takes place when weakly basic ion exchange resins are employed. This problem cannot be overcome by the use of strongly basic resins since these latter resins generally are too toxic to the fermentation systems. Although poor equilibrium can be alleviated somewhat by adding larger amounts of weakly basic resin to the fermentation broth, any advantage gained is offset by the increased cost of having to employ fermentors of increased capacities. Also, the addition of large amounts of resin increases the difficulties of maintaining adequate contact of the resin surface with the liquid broth. Although certain of these latter difficulties can be prevented by addition of successive small increments of resin, nevertheless, larger fermentors are still needed and problems of sterility and contamination are increased. Thus, it would be highly desirable if a method and apparatus could be provided which would overcome each of these foregoing difficulties and allow for maximum contact of small amounts of resin with the broth but with minimum attrition of the resin.

Accordingly, it is an object of this invention to improve the in situ recovery of fermentation elaboration products from fermentation broths by the use of ion exchange resins.

It is a further object of this invention to provide a method and apparatus for contacting ion exchange resins with fermentation broths during fermentation in such a manner as to avoid attrition of the resin by mechanical agitators.

It is still a further object of this invention to disclose a process and apparatus which will provide continuous maximum contact of small amounts of ion exchange resin with a fermentation broth during fermentation in a manner which will facilitate introduction of fresh resin and withdrawal of spent resin from the fermentation system with minimum problems of sterilization, contamination, or separation and recovery of the resin from the broth.

SUMMARY OF THE INVENTION

In accordance with the present invention it has now been found that these and other objects of the invention may be carried out by providing a fermentation vessel having inside one or more liquid-permeable, resin-impermeable zones that are connected by separate conduits through the vessel walls to reservoirs for the ion exchange resin which are external to the fermentation vessel, thereby forming a closed pathway for the resin. By the term "liquid-permeable" is meant a material which is permeable to the liquid fermentation broth. The apparatus also includes a pumping means interposed in one of said conduits which connects the internal zone and external reservoir, thus causing the resin to be circulated through the zones and reservoirs. By the term "reservoirs" is meant any suitable chamber for liquids and ion exchange resin which is connected by an inlet and outlet to the liquid-permeable zone and provided with means for the introduction of fresh resin and the withdrawal of resin slurry which has adsorbed thereon the desired fermentation elaboration product. This reservoir serves not only to contain fresh resin, but also provides a separation zone wherein the used resin may later be recovered from the fermentation broth by allowing the resin to settle to the bottom of the reservoir and be withdrawn.

More particularly, in accordance with this invention, a particulate ion exchange resin admixed with fermentation broth in the form of a suspension is pumped from a reservoir outside the fermentation vessel through one or more columns inside the fermentation vessel which are made of liquid-permeable but resin-impermeable material, such as fine mesh screen, whereby the fermentation broth is brought in continuous contact with the ion efchange resin. Te resin, mixed with the broth, is then pumped back into the reservoir and is then recycled through the fermentation vessel one or more times until adsorption of the product on the resin is complete. The pumping is then stopped or slowed down, allowing the resin in the reservoir to settle and separate from the liquid broth in the form of a slurry. The resin slurry is then withdrawn from the reservoir and eluted with a suitable solvent to recover the product adsorbed thereon. If necessary, additional resin may then be added to the reservoir in order to maintain an adequate concentration of resin in contact with the broth. Regenerated resin may also be recycled to the reservoir.

BRIEF DESCRIPTION OF THE DRAWING

The figure serves to further explain the invention, said figure diagrammatically showing one type of apparatus for carrying out the process in accordance with the invention.

The figure illustrates an apparatus for recovering fermentation products in situ from a fermentation vessel by circulating an ion exchange resin through a liquid-permeable but resin-impermeable zone located within the fermentation vessel.

DECRIPTION OF THE PREFERRED EMBODIMENTS

In brief, this invention is carried out by first initiating fermentation in a conventional manner in a fermentation vessel equipped with agitators and further provided with the liquid-permeable, resin-impermeable zones described above. When a sufficient concentration of elaboration product has been attained, as determined by routine assay, a suitable particulate ion exchange resin is added to the reservoir, and a pump, preferably one whose speed can be varied draws a portion of the broth from the liquid-permeable zone, admixes it with resin in the reservoir to form a resin suspension, and then continuously circulates the suspension through the two zone chambers at a velocity sufficient to keep the resin from settling out of the broth, thereby providing contact of the resin with the fermentation broth. After sufficient contact of the resin with the broth has been made, the pump is then slowed down or stopped. This permits the resin to substantially separate from the fermentation broth and settle at the bottom of the reservoir from which it may then be readily withdrawn in the form of a slurry. Additional resin may then be introduced into the reservoir and the process continued. The resin slurry may then be eluted in a known manner with a suitable aqueous buffer of solvent in order to recover the adsorbed product, whereupon the resin may, if desired, then be regenerated in a conventional manner and recycled to the reservoir after it has been regenerated, or new resin may be used.

It is possible, by adjusting the rate of circulation of the resin suspension to either continuously or periodically remove portions of the resin and correspondingly add equal amounts of resin to the system, thus rendering the process a continuous or semi-continuous one.

The circulation can be effected by a mechanically driven pump or any other suitable means for maintaining the flow through the system of the resin suspension at a rate which is greater than the settling rate of the resin particles themselves. The pump is desirably a rubber tubing pump, an eccentric chamber pump or the like, which will minimize attrition of the resin.

It is preferred, in conducting this process, that the pump be capable of having its speed varied in order to control at will the movement of resin-broth suspension. Thus, for example, when the upward linear velocity in the external reservoir is less than the settling rate of the resin, the resin will accumulate and remain in the external reservoir. On the other hand, when the upward velocity exceeds the settling rate, the resin will pass freely into the liquid-permeable zone in the fermentor. Accordingly, in order to maintain satisfactory circulation of the suspension, it has been found that the velocity should preferably exceed approximately one foot per minute (eight gallons per square foot cross-section per minute) but this value may range from 0.3 to 3.0 feet per minute, depending on the particle size and density of the resin. The distribution of resin in the resin-impermeable zone is essentially independent on the pumping velocity, since the fermentor agitator tends to keep the resin in uniform distribution within the resin-impermeable zone.

From the foregoing, it will be understood that it is preferred that this process be carried out in such a manner that the direction of flow of the resin and broth is upward in the reservoir and downward in the resin chamber. One reason for this is that the mechanical agitation in the fermentor tends to prevent the settling in the resin chamber. More important, the direction of flow provides the easiest control of the rate of settling of the resin particles in the reservoir. Thus, although circulation in the opposite direction is possible, it is undesirable because resin then tends to accumulate at the bottom of the reservoir, blocking further movement of the resin.

For maximum effectiveness or product recovery it is essential that the resin be brought in contact with the fermentation broth while the fermentation is still proceeding. Thus, the resin may be circulated through the fermentation tank starting at the beginning of the fermentation or as late as thirty minutes prior to termination of the fermentation process. Desirably, the resin should be brought in contact with the broth from about ten hours after the fermentation has begun to about one hour before the fermentation is terminated.

It will be apparent from the foregoing description that more than one resin chamber may be employed in each fermentation vessel, in combination with one or more reservoirs and pumps. Thus, a plurality of liquid-permeable columns, arranged in parallel inside the fermentation vessel, and connected to a single large reservoir and pump, may be utilized in order to provide a maximum area of contact of the resin with the broth with a minimum of equipment. Alternatively, each column could be connected to a separate reservoir, each provided with its own pump.

The material employed to form the liquid-permeable columns can, as mentioned above, be any liquid-permeable but resin-impermeable material. Preferably, however, this material should be made of fine mesh wire screen in order to insure maximum contact of the resin with the broth. For purposes of this invention it has been found satisfactory to use a screen having a mesh size of from 60 to 100 mesh, depending upon the size of the resin granules.

The size of the particles of resin material may vary considerably. The size depends largely on the nature and concentration of product to be recovered. The optimum size can be best determined by routine tests, although generally a particle size of from 0.3 to 1.0 mm. is preferred.

For purposes of recovering most fermentation products, the quantity of ion exchange resin used may be small. For example, when recovering a weak acid such as p-toluic acid or 2,3-dihydroxy-p-toluic acid, it is sufficient to use 0.5 volume percent of resin material per volume of liquid treated per hour. Generally, however, for the recovery of most fermentation products, this percentage may be varied within a range of from 0.1 to 10 percent per volume of liquid broth. Desirably, as small a quantity as possible should be employed.

The type of the ion exchange resin employed will, of course, depend upon the nature of the product which is to be adsorbed, and also the possible toxic effects of the resin on the fermentation. When weak organic acids such as oxalic, succinic, benzoic, p-toluic, or di-hydroxy-p-toluic acids are being recovered, it is preferable to use a weakly basic ion exchange resin such as IRA–93 or IR–45 (Rohm and Haas) for good absorptive capacity with minimal toxic effects to the microorganisms. Antibiotics such as streptomycin may similarly be recovered by employing weekly acidic ion exchange resins such as IR–120 (Rohm and Haas).

Inasmuch as the resin comes in direct contact with the broth during fermentation, and since further certain organisms are sensitive to the presence of foreign microorganisms, it is desirable to sterilize the ion exchange resin prior to its addition to the reservoir. This sterilization may be achieved by treatment of the resin with heat or steam. If, however, the resin is unstable in the presence of heat, an antiseptic such as an aqueous lower alkanol may be employed instead.

After adsorption, the resin may be eluted with a suitable eluting agent in order to recover the fermentation product from the resin, and the eluate treated in order to crystallize, extract or the like, the final product from the eluate. It will be recognized by those skilled in the art that the nature of the eluting agent and the manner of recovery of the product from the eluate will be determined by the nature and properties of the recovered product. United States Pat. No. 3,000,792, referred to above, for example, discloses various resins, eluting agents, and extraction methods suitable for recovering different types of antibiotics obtained by fermentation. Similarly, weak organic acids may be eluted from ion exchange resins with dilute aqueous mineral acids, such as five percent hydrochloric acid, alcoholic solutions of mineral acids, or the like.

The resin from which the product has been eluted may then be discarded and fresh, sterilized resin added to the reservoir in its place. Alternatively, and more desirably, the resin may be regenerated by treatment with a suitable regenerating solution and then recycled to the fermentation system.

Referring now to the figure, the process and apparatus will be described in greater particularity, using the production and recovery of 2,3-dihydroxy-p-toluic acid and p-toluic acid as a convenient illustration. It will be understood, however, that this method may also be applied in such diverse fermentative methods as the conversion of steroid, the production of antibiotics, vitamins, or the like.

In the figure, a conventional fermentation vessel 11 is provided with an agitation means comprising a motor 10 and a central vertical shaft rotated by said motor, to which shaft are attached blades 13. Although four sets of blades are shown for sake of illustration, it will be understood that a lesser or greater number of blades may be provided, depending upon the degree of agitation required. Conventionally, a vertical rotating shaft with paddle blades has been found to be most effective.

Also located inside the fermentation vessel is liquid-permeable chamber 14 which in this drawing is illustrated as being formed from wire screen, the openings of which are smaller than the diameter of the selected resin particles. It will be understood that chamber 14 may, in fact, comprise a series of parallel chambers, each provided with separate conduit which is attached to one or more external reservoirs. In the instant drawing, single chamber 14, which preferably is a wire screen cylinder which is vertically disposed inside the fermentation vessel, is connected to reservoir 18 by line 15 which passes through the lower end of fermentation vessel 11. Advantageously, the bottom of chamber 14 should be somewhat funnel-shaped, converging at the point where it connects with line 15, in order to facilitate the passage of resin and broth. The top of chamber 14 should desirably be located so as not to extend above the surface of the broth in order that there be provided maximum contact of resin and broth, and a good flow pattern of resin suspension obtained. Chamber 14 is connected at its upper end to reservoir 18 by line 21 which passes through the upper end of fermentation vessel 11. The reservoir is further provided with inlet valve 20 and outlet valve 17. Interposed in line 15, with its intake end nearest chamber 14 and its output end nearest reservoir 18, is variable speed pump 16.

In the practice of this invention, utilizing aforedescribed apparatus, fermentation vessel 11 is filled with a suitable fermentation medium to a point extending above the top of chamber 14 and inoculated with a microorganism in a known manner. The fermentation broth is then agitated with blades 13 by means of motor 10. After the fermentation has proceeded for the desired length of time, pump 16 is started up, thereby drawing fermentation broth 12 through chamber 14 where it passes via line 15 upward into reservoir 18. In the reservoir the broth forms a suspension with resin particles 19, and as the speed of the pump is increased, the resin-broth mixture is forced upward through line 21 and downward into chamber 14 where the cycle of resin and broth through the pump and reservoir is then repeated as many times as is necessary until the resin has adsorbed the desired amount of fermentation product. The rate of flow of the resin is controlled by the speed of the pump 16.

Recovery of the resin from the fermentation broth is thus readily achieved by slowing down or stopping pump 16 where it substantially separates out from whatever amount of liquid broth is entrapped in the reservoir at that moment. The resin, in the form of a thick slurry, is then removed through outlet 17 and treated with eluting agents, etc. Fresh or regenerated resin is then introduced into reservoir 18 through inlet 20, and the process is repeated.

The invention will now be illustrated by a specific example directed to the microbial oxidation of p-xylene to form p-toluic acid and 2,3-dihydroxy-p-toluic acid, and recovery of these acids utilizing the aforedescribed apparatus.

EXAMPLE I

To illustrate the invention, three fermentations were run with Nocardia salmonicolor ATCC No. 19,149 which converts p-xylene to 2,3-dihydroxy-p-toluic acid (DHPT) and to p-toluic acid (PTA). All runs were in a 3-liter fermentor provided with an agitator, stirred at 1760 r.p.m. with a 2" diameter turbine, and a single vertical column formed from 60 mesh screen. Each end of the column was connected by pipes to a reservoir for the ion exchange resin. A rubber tubing pump was located in the lower of the two pipes connecting the screened zone with the reservoir. The culture was grown 48 hours in a mineral salts-hexadecane-urea medium, to a cell concentration of 3.3% packed cell volume. At that time a feed of 90% xylene–10% hexadecane was started to provide substrate for the conversion. In run A no resin was added. In run B, 9.2 weight percent of a weakly basic ion exchange resin (Rohm and Haas IRA–93) was added. Products were analyzed by their ultra-violet absorption spectrum.

The resin containing products was water washed and eluted with acidic methanol for analysis.

The resin from run B was found to be broken into very fine particles within several hours. At the time of harvest the particles were extremely fine, making recovery difficult, and reuse impossible. In run C, 4% by weight IRA-93 was added to the reservoir. The pump was started to give a vigorous upward flow of resin in the column and into the fermentor. At ten hours the pump was slowed down, and the resin was accumulated in the reservoir and then withdrawn from the system. Ninety-four percent of the resin was recovered and eluted with acidic methanol to recover the product. 1.17 grams of DHPT per liter of broth was recovered but no PTA was found on the resin removed. On the eleventh hour of the fermentation, a second increment of resin, 5.3 weight percent based on starting fermentation volume was added, and allowed to circulate until the twenty-fourth hour. This resin contained an additional 1.64 grams of DHPT per liter of broth but no PTA. A third resin increment yielded 0.20 gram of DHPT and 0.73 gram PTA.

In the following runs, the amounts are measured in grams per liter of broth.

| Time after addition of xylene | A — No resin added | | B — Direct addition of resin | | | | C — Screen Column | | | |
|---|---|---|---|---|---|---|---|---|---|---|
| | | | Soluble | | On resin | | Soluble | | On resin | |
| | DHPT | PTA | DHPT | PTA | DHPT | PTA | DHPT | PTA | DHPT | PTA |
| 10 | .15 | .15 | .097 | .148 | .61 | 1.33 | .057 | .075 | 1.17 | 0 |
| 24 | .40 | .35 | .120 | .420 | .89 | 1.34 | .182 | .375 | 2.81 | 0 |
| 36 | .40 | .5 | | | | | | | 3.0 | .73 |
| 48 | .50 | 1.5 | .045 | .54 | .62 | .24 | | | | |

As can be adduced from the foregoing data, not only does the present method, as shown in Run C, effect substantial savings of resin and ease of recovery of product, as compared with Run B, but more importantly, there is obtained a 25% increase in overall yield of the two acids when Runs B and C are compared. Moreover, and equally significant, the yield of DHPT, which is economically and commercially more important than PTA, is likewise unexpectedly increased when compared with the yield of PTA in Run B.

What is claimed is:

1. In combination with a fermentation vessel containing agitator means, the improvement comprising, in combination:
   (a) liquid-permeable zone within said fermentation vessel; and
   (b) means for circulating a liquid suspension containing a particulate ion exchange resin through said liquid-permeable zone, said liquid-permeable zone being substantially impermeable to said resin particles, and said means for circulating said suspension comprising, in combination:
      (1) a reservoir external to said fermentation vessel; and
      (2) pumping means and conduit means for circulating suspension from said reservoir to said liquid-permeable zone and back to said reservoir.

2. Apparatus as defined in claim 1 including means for adding and withdrawing resin from said reservoir.

3. Apparatus as defined in claim 1 wherein said liquid-permeable zone comprises a cylindrical screen of between about 60 and 100 mesh.

4. Apparatus as defined in claim 1 wherein said liquid permeable zone comprises a plurality of individual zones.

5. Apparatus as defined in claim 1 wherein said pumping means is a variable speed pump.

6. Apparatus for the separation of fermentation elaboration products from fermentation broth by adsorbing said products on ion exchange resins comprising a fermentation tank; agitator means located within said tank; liquid-permeable but resin-impermeable zone located within said tank, said zone being connected at both ends by conduits with a reservoir located external to said fermentation tank; pumping means interposed in one of said conduits between said zone and said reservoir for circulating said ion exchange resin through said zone and reservoir in a closed circuit; and means for introducing and withdrawing said resin to and from said reservoir.

7. In the process for the separation and recovery of fermentation elaboration products from fermentation broths containing growing microorganisms and substrate by contacting said broths with a particulate ion exchange resin in a fermentation vessel equipped with mechanical agitators, the improvement comprising pumping a suspension of said resin and broth during the fermentation period from an external reservoir through a liquid-permeable but resin-impermeable zone located within said fermentation vessel, and back to said external reservoir, and continuing the pumping of said suspension through said fermentation vessel and said external reservoir one or more times.

8. In the process for the separation and recovery of fermentation elaboration products from fermentation broths containing growing microorganisms and substrate by contacting said broths with a particulate ion exchange resin in a fermentation vessel equipped with mechanical agitators, the improvement comprising admixing said resin with said broth in a first zone located outside the fermentation vessel to form a suspension, cycling said suspension upwardly through said first zone at a rate greater than the settling rate of the resin particles within said suspension, and downwardly through a second zone located within said fermentation vessel, said second zone being liquid-permeable but resin-impermeable, thereby adsorbing at least a portion of said elaboration product on said resin, continuing the cycling of said suspension for a time sufficient to adsorb additional elaboration product on said resin, thereafter circulating said suspension at a rate slower than the settling rate of the resin particles until the particles settle at the bottom of said first zone in the form of a slurry, withdrawing the slurry from the first zone, and recovering the adsorbed product therefrom.

References Cited
UNITED STATES PATENTS

| | | | |
|---|---|---|---|
| 2,111,726 | 3/1938 | Plews | 195—143X |
| 2,786,831 | 3/1957 | Bartels et al. | 99—1(I.E.) |
| 3,000,792 | 9/1961 | Denkewalter et al. | 195—116 |
| 3,057,784 | 10/1962 | Davis et al. | 195—3(H) |
| 3,169,099 | 2/1965 | Davis | 195—3(H) |
| 3,419,469 | 12/1968 | Humphrey et al. | 195—116 |

ALVIN E. TANENHOLTZ, Primary Examiner

U.S. Cl. X.R.

195—28, 80, 105